United States Patent [19]

Itoh et al.

[11] Patent Number: 5,000,006
[45] Date of Patent: Mar. 19, 1991

[54] INDUSTRIAL PROCESS FOR THE SEPARATION AND RECOVERY OF CHLORINE

[75] Inventors: Hiroyuki Itoh; Yoshitsugu Kono; Isao Kikuchi; Shinji Takenaka, all of Ohmuta; Masanobu Ajioka, Yokohama; Mitsuo Kudoh, Tokyo, all of Japan

[73] Assignee: Mitsui Toatsu Chemicals, Incorporated, Tokyo, Japan

[21] Appl. No.: 310,929

[22] Filed: Feb. 16, 1989

[30] Foreign Application Priority Data

| Feb. 16, 1988 | [JP] | Japan | 63-31792 |
| Feb. 17, 1988 | [JP] | Japan | 63-32837 |
| Mar. 15, 1988 | [JP] | Japan | 63-59428 |

[51] Int. Cl.$^5$ .............................................. F25J 3/00
[52] U.S. Cl. ...................................... 62/17; 55/23; 55/71; 62/20; 62/23
[58] Field of Search ............... 55/71, 23; 62/17, 20, 62/23, 11

[56] References Cited

U.S. PATENT DOCUMENTS

| 2,868,325 | 1/1959 | Cathala | 55/71 |
| 3,501,922 | 3/1970 | Schmidt et al. | 62/17 |
| 3,948,622 | 4/1976 | Tsao | 55/71 |
| 3,972,691 | 8/1976 | Fukushima et al. | 55/23 |
| 4,128,409 | 12/1978 | Bennett | 62/17 |
| 4,321,795 | 3/1982 | Brandt et al. | 62/11 |
| 4,474,587 | 10/1984 | Matsumoto et al. | 55/71 |

FOREIGN PATENT DOCUMENTS 0710398 6/1968 Belgium.
2231617 12/1974 France.

OTHER PUBLICATIONS

RO-A-62 211 (T. Ioan et al) & Chemical Abstracts, vol. 89, No. 12, May 1978, p. 268, col. 2, Abstract No. 94428h.

Primary Examiner—Ronald C. Capossela
Attorney, Agent, or Firm—Oblon, Spivak, McClelland, Maier & Neustadt

[57] ABSTRACT

A gaseous mixture containing chlorine, carbon dioxide and non-condensable gas is compressed and cooled to separate it into a residual gas formed principally of a major portion of the non-condensable gas and a condensate formed primarily of chlorine. The condensate is fed to a stripping column to desorb carbon dioxide and a minor portion of the non-condensable gas dissolved in the condensate. The stripped gas formed primarily of chlorine and carbon dioxide may be treated further. Namely, the stripped gas is mixed with the residual gas. At least a portion of the mixed gas is fed into an absorption column, whereby a major portion of remaining chlorine is absorbed to lower the chlorine content. Removal of chlorine from such a gaseous mixture or an off-gas from the above process can be achieved by washing it with an aqueous solution or suspension containing an alkali metal sulfite and/or an alkaline earth metal sulfite while controlling the pH of the solution or suspension within a range of 1.9–6.3.

5 Claims, 4 Drawing Sheets

INDUSTRIAL PROCESS FOR THE SEPARATION AND RECOVERY OF CHLORINE

BACKGROUND OF THE INVENTION (1) Field of the Invention

This invention relates to a process for separating and recovering chlorine from a gaseous mixture comprising chlorine, carbon dioxide and non-condensable gas. This invention is also concerned with a process for removing chlorine from such a gaseous mixture.

Specifically, this invention relates to a process for separating and recovering chlorine from a gaseous mixture containing chlorine, carbon dioxide and non-condensable gas at high concentrations. This invention is also concerned with a process for recovering chlorine from a gaseous mixture containing chlorine, carbon dioxide and at least 50% by volume of non-condensable gas. Further, this invention also pertains to a process for absorbing and removing chlorine gas contained in carbon dioxide gas which is formed upon production or utilization of chlorine.

(2) Description of the Related Art

A variety of processes have already been proposed for the recovery of chlorine from a gaseous mixture containing chlorine, including the following patent publications:

(1) U.S. Pat. No. 3,972,691 discloses a process for recovering liquid chlorine from a gaseous mixture comprising 20–90% by volume of chlorine, 10–80% by volume of carbon dioxide, nitrogen, oxygen and carbon monoxide. The process comprises compressing the gaseous mixture at 4–8 atm, cooling and liquefying the compressed gaseous mixture in a rectification column of the total reflux type, and then adjusting the temperature of liquid chlorine collected in a bottom part of the rectification column to cause evaporation of carbon dioxide dissolved in the liquid chlorine.

(2) U.S. Pat. No. 2,199,797 discloses that an organic impurity contained at a concentration of 1% weight or lower in chlorine gas can be removed with liquid chlorine by bringing the chlorine gas into counter current contact with liquid chlorine in a washing column.

(3) U.K. Patent No. 938,073 discloses a process for separating a non-condensable impurity, which has a boiling point lower than chlorine and forms an explosive mixture with chlorine, from gaseous chlorine containing the impurity. The process comprises lowering stepwise the temperature of the gaseous chlorine and bringing the final gaseous residue into counter current contact with liquid chlorine, the temperature of which has been lowered to the condensing temperature of gaseous chlorine or lower, in a liquefaction column to liquefy gaseous chlorine, whereby chlorine is separated from the impurity of the low boiling point.

(4) U.S. Pat. No. 3,443,902 discloses a process to compress chlorine gas, which has been obtained by bringing an impurity-containing chlorine gas into counter current contact with liquid chlorine in a washing column and the impurity has hence been absorbed and removed by the liquid chlorine, thereby liquefying a portion of the chlorine gas by its heat exchange with the liquid chlorine in the washing column, and then to use the so-liquefied chlorine for the same purpose as the liquid chlorine mentioned above.

(5) U.K. Patent No. 1,164,069 discloses that a gaseous mixture composed of non-condensable gas, including nitrogen and chlorine, can be separated into liquid chlorine and the non-condensable gas by compressing the gaseous mixture to 6–10 atm, cooling the compressed gaseous mixture in two stages, and then cooling the cooled gaseous mixture further to $-120°$ F. to $-150°$ F. by heat exchange.

(6) U.S. Pat. No. 2,540,905 discloses a process for recovering chlorine in a form free of carbon dioxide. The process comprises absorbing chlorine from a liquefaction residual gas, which has been obtained after electrolysis of brine and contains 5–10% by weight of chlorine along with carbon dioxide, carbon monoxide, hydrogen, nitrogen, oxygen and other gaseous components, with a chlorinated solvent; and then causing carbon dioxide, which has been absorbed at the same time, to evaporate at a temperature higher than the absorption temperature by a method such as heating a lower part of an absorption column.

(7) U.S. Pat. No. 2,765,873 discloses a process for recovering chlorine in a form substantially free of non-condensable gas. The process comprises causing a solvent to absorb a gaseous mixture, which is composed of 30–50 wt.% of chlorine and air, under a pressure of 2.0–14.3 atm at a column top temperature of from $-22.8°$ C. to 32.2° C. and a column bottom temperature higher by from 27.8° C. to 52.8° C. than the column top temperature.

(8) West German Patent No. 2413358 discloses a process to absorb chlorine alone from a mixture of chlorine and carbon dioxide gas as the hydrochlorite of an alkali metal and/or alkaline earth metal by using a multi-stage counter current absorption apparatus making use of an alkali metal hydroxide and/or an alkaline earth metal hydroxide and operating the apparatus while controlling the pH of the final stage of the liquid side at about 7.5.

The processes disclosed in the publications (1), (2), (3) and (4) respectively are applied where chlorine or chlorine and carbon dioxide as one or more condensable components are contained at relatively high concentrations. For the recovery of chlorine from a chlorine-containing gaseous mixture in which the concentration of non-condensable gas is about 50% by volume or even higher, these processes are accompanied by drawbacks due to the abundant existence of non-condensable gas.

These processes all employ counter current contact between descending liquid chlorine and ascending crude chlorine gas in a column although their purposes are for liquefaction, washing and distillation respectively and hence differ from each other. When non-condensable components are contained at high level in an ascending crude chlorine gas, it is thus impossible to avoid entrainment due to the ascending gas and a reduction in the efficiency of gas-liquid contact due to channeling of the descending liquid or a similar cause, thereby making it difficult to achieve their separation as intended.

If the amount of the descending liquid is increased with a view toward maintaining the efficiency, both the refrigeration load and heating load of the distillation column increase, and in addition, larger items of greater equipments—such as column main body, condenser and reboiler—must be used. This approach is therefore not economical. In the case of the process (4) the circulating load of non-condensable gas becomes enormous and the dew point of the compressed gas drops. If the compression pressure is low, there is the potential problem that chlorine cannot be liquefied upon its heat exchange with the washing column. Even if liquefaction is feasible, the power cost increases because of an increased compression ratio of the compressor and an increased circulating load so that the advantage of this process is lost.

Further, the processes (1) and (5) are basically intended for chlorine gas of a high concentration. A chlorine-containing gaseous mixture to be treated is compressed and cooled to liquefy chlorine for its separation. These processes are however intended for the recovery of high-purity chlorine. A waste gas separated from chlorine and composed principally of non-condensable gas therefore contains chlorine at a concentration as high as 5–9% by volume in the process (1) and 10% by volume even in the process (5).

The industrial recovery of chlorine poses an atmospheric pollution problem through the discharge of a waste gas containing chlorine at such high concentrations. To be ready for disposal as a waste, a gas must be free of chlorine. This however requires at least one chemical in a huge quantity for the removal of chlorine, to say nothing of facilities, and moreover, leads to a loss of chlorine. These processes are hence not economical. To reduce the chlorine content in a waste gas to such a low level that the chlorine may be ignored, it is indispensable to increase the compression pressure further and at the same time to lower the cooling and liquefying temperature further. This however leads to an increased power cost and also to an increased refrigeration cost. Moreover, it is not preferable for safety of facilities to compress a chlorine-containing gaseous mixture to a high pressure. In addition, it is not permissible to lower the cooling and liquefying temperature to the freezing temperature of carbon dioxide ($-56.6°$ C. at 5.2 atm) or lower so as to avoid blocking of facilities due to occurrence of dry ice. Such a liquefaction process cannot therefore avoid inclusion of chlorine at a certain concentration in a waste gas. The processes (6) and (7) both make use of a solvent, whereby an impurity is absorbed and then desorbed to recover chlorine. Of these, the process (6) includes heating a lower part of an absorption column to cause a portion of both the chlorine and a major portion of the carbon dioxide absorbed in the solvent to evaporate so that chlorine gas obtained in an evaporation column may have a higher purity. It is hence unavoidable that chlorine accompanies a waste gas from the top of the absorption column. In particular, where carbon dioxide is contained at a high level, it is necessary to intensify the heating of the lower part of the absorption column correspondingly. As a result, the chlorine concentration in the waste gas increases and the loss of chlorine and the solvent rises significantly.

The process (7) requires evaporation to be conducted under a substantially high pressure in an evaporation column because chlorine released from a solvent is recovered there by liquefaction. If the solvent absorbs more air than necessary in the absorption column, chlorine is recovered with a decreased purity. It is hence necessary to reduce the amount of the absorbent solvent. Due to this requirement, where carbon dioxide and non-condensable gas are contained at a high level, the absorption of chlorine cannot be achieved sufficiently and the levels of chlorine and the solvent accompanying the waste gas increase abruptly.

To lower the chlorine concentration in a waste gas by the solvent absorption method, the choices include increasing the amount of a solvent, lowering the temperature of the solvent or increasing the pressure of an absorption column further. It is however difficult to recover chlorine with a high purity because the absorption of carbon dioxide and non-condensable gas is promoted whichever method is relied upon.

Chlorine is a useful raw material produced industrially on a large scale primarily by brine electrolysis, and is used widely. Gaseous components are formed as by-products upon production of chlorine. These components are accompanied by chlorine, so that due to the toxicity of chlorine, they cannot be released into the atmosphere without further treatment.

Accordingly, chlorine contained in such a gas is removed usually by its absorption with an alkaline substance. However, when another gas is contained besides chlorine and said another gas is acidic (like carbon dioxide gas) it is not only chlorine but also carbon dioxide that is absorbed in an alkaline solution. As a corollary to this, an alkali is required in an amount equal to the sum of the carbon dioxide and chlorine. In particular, where a gas contains carbon dioxide at a high level and chlorine at a trace level, an inconvenience arises in that a large amount of an alkali is required for the removal of such a trace amount of chlorine. It is accordingly desired to develop a process for the selective absorption and removal of chlorine which is contained in carbon dioxide.

The process (8) has already been proposed as a process for removing chlorine from a mixture of carbon dioxide gas and chlorine. In this process, pH 7.5 is however a value far higher than 6.35, which is the first dissociation constant (pKa) of carbonic acid, as shown in FIG. 4 and falls within the range where carbon dioxide gas reacts with an alkali metal hydroxide and/or alkaline earth metal hydroxide to form the corresponding bicarbonate.

To absorb chlorine alone from the mixture of carbon dioxide and chlorine in the above range, it is necessary to use an alkali exactly in an equimolar amount as chlorine. Where the concentration of chlorine varies, it is difficult to balance the alkali in quantity with chlorine.

In addition, pH 7.5 is close to the dissociation constant of hydrochlorous acid. When the pH becomes lower than the above level, hydrochlorous acid takes the form of a free acid so that it becomes prone to decomposition. Precise control of pH is therefore needed. Even if chlorine is removed successfully, the resulting hydrochlorite solution has strong oxidative effects and offensive odor and cannot thus be discarded as is. An additional step is therefore required for its reduction.

SUMMARY OF THE INVENTION

An object of this invention is to provide a process for separating and recovering chlorine from a gaseous mixture comprising chlorine, carbon dioxide and non-condensable gas, specifically, for recovering the chlorine substantially in its entirety from the gaseous mixture and treating any chlorine, which may remain in the residual gas, to permit release of the residual gas into the atmosphere.

In a first aspect of this invention, there is thus provided a process for the separation and recovery of chlorine from a gaseous mixture comprising chlorine, carbon dioxide and non-condensable gas. The process comprises compressing and cooling the gaseous mixture thereby to separate the gaseous mixture into a residual gas formed principally of a major portion of the non-condensable gas and a condensate formed primarily of chlorine, and feeding the condensate to a stripping column to desorb carbon dioxide and a minor portion of the non-condensable gas dissolved in the condensate.

In a second aspect of this invention, there is also provided a process for the separation and recovery of chlorine from a gaseous mixture comprising chlorine, carbon dioxide and non-condensable gas in a separation and recovery system. The process comprises (i) compressing the gaseous mixture, and then cooling and liquefying the same thereby to separate it into a residual gas formed principally of a major portion of the non-condensable gas and a condensate formed primarily of chlorine, (ii) feeding the condensate alone to a stripping column to desorb carbon dioxide and a minor portion of the non-condensable gas dissolved in the condensate, thereby separating and recovering chlorine, (iii) mixing a stripped gas, which has flowed out from the top of the stripping column and is formed primarily of chlorine and carbon dioxide, with the residual gas from step (i), (iv) feeding at least a portion of the mixed gas into an absorption column which makes use of a halogenated hydrocarbon as a solvent, whereby a major portion of remaining chlorine is absorbed to lower the chlorine content, preferably to 1% by volume or lower and a waste gas composed of carbon dioxide and the non-condensable gas is separated and released out of the system, and (v) feeding the solvent with chlorine absorbed therein into a distillation column to separate chlorine from the halogenated hydrocarbon.

In a third aspect of this invention, there is also provided a process for the removal of chlorine from a gaseous mixture comprising chlorine gas and carbon dioxide gas, for example, from the waste gas released in step (iv) of the process according to the second aspect of this invention. The process comprises feeding an aqueous solution or suspension containing an alkali metal sulfite and/or an alkaline earth metal sulfite, and washing the gaseous mixture with the solution or suspension while controlling the pH of the solution or suspension within a range of 1.9–6.3, whereby chlorine is solely removed from the gaseous mixture.

In the first aspect of this invention, a gaseous mixture comprising chlorine, carbon dioxide and non-condensable gas is cooled and liquefied to separate the non-condensable gas in advance. After feeding the condensate alone to a stripping column, it is distilled to recover chlorine. The process according to the first aspect of this invention allows to reduce the load of the stripping column, thereby making it possible to reduce the diameter of the stripping column significantly compared with the stripping column used in U.S. Pat. No. 2,765,873. The initial cost for the stripping column can therefore be reduced. The process according to the first aspect of this invention has therefore a significant value from the industrial viewpoint.

In the second aspect of this invention, a chlorine-recovering step making use of a halogenated hydrocarbon solvent is combined with the process according to the first aspect, whereby the chlorine contained in a gas fed for treatment can be recovered substantially in its entirety as high-purity chlorine. The second aspect has therefore established a process for the separation and recovery of chlorine, which is very advantageous from the industrial viewpoint.

The third aspect of this invention permits removal of chlorine from a gas which contains carbon dioxide gas and chlorine. When a waste gas occurred in the process according to the second aspect, which is composed of carbon dioxide and non-condensable gas and contains chlorine at a concentration of 1% by weight or lower, is treated by the process according to the third aspect, the chlorine contained at such a trace level that the process according to the second aspect cannot remove it can be removed almost completely. It is hence possible to complete a plant which is practically free from the problem of pollution.

As has been described above, the present invention is extremely valuable from the practical viewpoint in the industrial production of chlorine

DETAILED DESCRIPTION OF PREFERRED EMBODIMENTS

In each of the first to third aspects of this invention, the process is applied to a gaseous mixture composed of carbon dioxide and non-condensable gas and containing chlorine or to carbon dioxide containing chlorine.

The following gases may be mentioned by way of example as applicable gases:

(a) a gaseous mixture which is in the step of producing chlorine by oxidizing hydrogen chloride and contains chlorine, carbon dioxide and non-condensable gas;

(b) a gaseous mixture which is obtained by removing chlorine to a substantial extent from the gaseous mixture (a) and contains a still-remaining portion of the chlorine along with the carbon dioxide and non-condensable gas; and (c) a mixture containing chlorine gas and carbon dioxide.

Upon chlorination or phosgenization of organic compounds, a great deal of hydrogen chloride is formed as a byproduct. Since its quantity has been much greater than the demand for hydrochloric acid, a lot of hydrogen chloride has been unutilized and disposed wastefully. A substantial cost has also been required for its disposal.

Accordingly, it has been desired to develop a process for efficiently recovering chlorine from hydrogen chloride, which has been discarded in a large quantity as mentioned above, and industrially producing chlorine.

It has been known for many years to produce chlorine by oxidizing hydrogen chloride. However, no industrial production process has been completed.

Recently, it has been found that a chromium oxide catalyst obtained by calcining chromium hydroxide in particular has high activity even at relatively low temperatures, leading to the provision of an industrial process for producing chlorine by oxidizing hydrogen chloride.

In the process according to each of the first to third aspects of this invention, the gaseous mixture comprising chlorine, carbon dioxide and non-condensable gas, to which the process is applied, may be a gaseous mixture formed in a process such as that developed recently for the production of chlorine. Namely, this invention is useful as an effective process for the recovery of chlorine or as a process for the removal of chlorine from a waste gas in the above industrial production process of chlorine.

Certain processes embraced by the present invention will hereinafter be described in detail.

Figure 1:
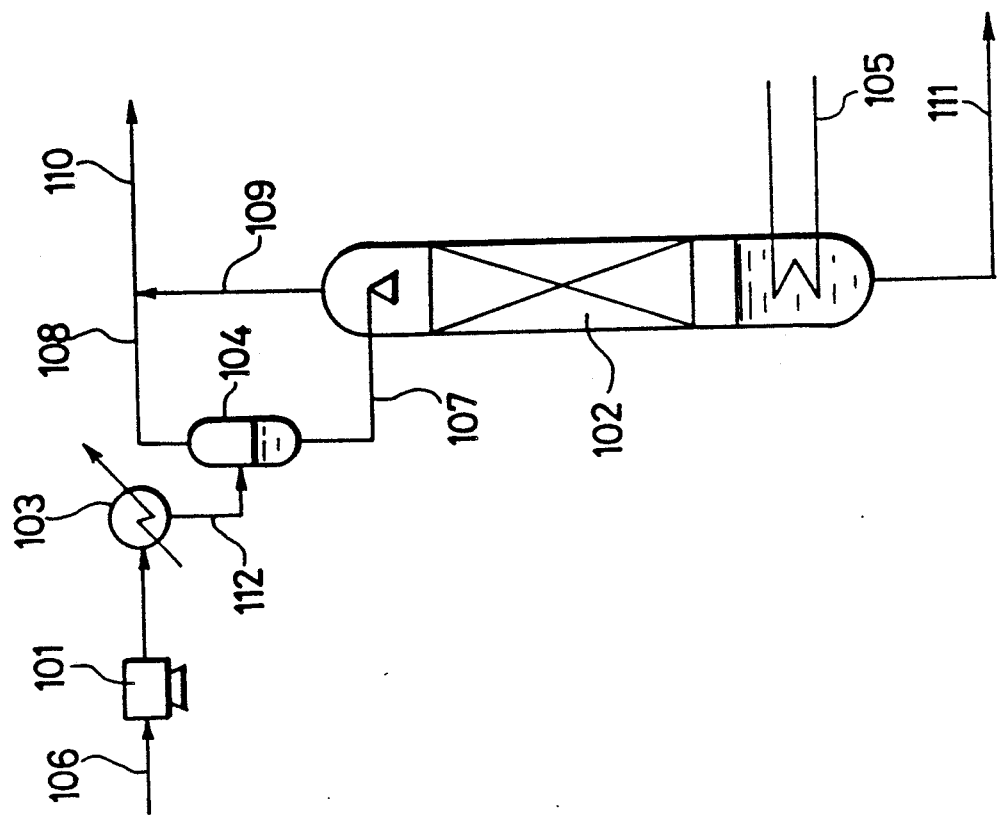
FIG. 1 is a flow sheet showing by way of example an apparatus for practicing a process in which chlorine is separated and recovered from a gaseous mixture, which comprises chlorine, carbon dioxide and non-condensable gas, by (1) compressing and cooling the gaseous mixture, (2) separating the resultant gaseous mixture into a residual gas formed principally of a major portion of the non-condensable gas and a condensate formed primarily of chlorine, and then (3) feeding the condensate alone to a stripping column to desorb carbon dioxide and a minor portion of the non-condensable gas dissolved in the condensate.

In FIG. 1, there are illustrated a compressor 101, a stripping column 102 which may be a conventional tray column or packed column, a heat exchanger 103, a separator 104, and a reboiler 105.

A gaseous mixture which generally contains 10–60% by volume of chlorine and 40–90% by volume of carbon dioxide and non-condensable gas is fed through a line 106 and is then compressed to a predetermined pressure by the compressor 101.

As the non-condensable gas, may be mentioned nitrogen, oxygen or carbon monoxide by way of example.

The compressed gaseous mixture is cooled to a predetermined temperature by the heat exchanger 103, whereby a portion of the chlorine is liquefied. The resultant liquid-gas mixture is fed via a line 112 to the separator 104, where the mixture is separated into a residual gas formed principally of a major portion of the non-condensable gas and a condensate formed primarily of chlorine.

The condensate is fed via a line 107 to an upper part of the stripping column 102, and while falling down through the column, the condensate is brought into contact with chlorine vapor boiled up by the reboiler 105. As a result, carbon dioxide and non-condensable gas dissolved in the condensate are caused to evaporate so that the condensate is collected as liquid chlorine having a high purity in the bottom of the stripping column and is thereafter drawn as product chlorine through a line 111.

When a gaseous mixture comprising chlorine, carbon dioxide and non-condensable gas is compressed and then charged as is into a stripping column to conduct liquefaction and distillation there, the stripping column is required to have a larger diameter so long as an ordinary superficial velocity is employed However, when the non-condensable gas is separated out and the condensate alone is charged into a stripping column as in the present invention, it is possible to perform stripping in a column of a diameter as small as about 30% compared to the aforementioned stripping column.

Carbon dioxide and non-condensable gas which have been stripped from the condensate are allowed to flow out of the stripping column at the top thereof, to pass through a line 109, and then to join the residual gas fed from the separator through a line 108. Thereafter, they are released as waste gas out of the system.

To recover chlorine from the gaseous mixture as much as possible, it is desirable to set the compression pressure of the compressor as high as possible and the cooling temperature of the heat exchanger as low as possible. It is however not recommendable to increase the compression pressure of a chlorine-containing gas indiscriminately from the standpoint of safety. In addition, there is another limitation that the cooling of liquefaction of a mixture containing carbon dioxide should be higher than the melting point of carbon dioxide ($-56.6°$ C. at a $CO_2$ partial pressure of 5.2 atm). Accordingly, a limitation is also imposed on the cooling temperature to prevent blocking of equipment due to occurrence of dry ice. The compression pressure at the compressor and the cooling and liquefying temperature at the heat exchanger should be suitably determined in view of economical factors such as the power required by the compressor, the cooling load at the heat exchanger, the heating load at the reboiler and the cost for the disposal of waste gas while taking the above-mentioned matters into parallel consideration.

In general, it is preferable to set the compression pressure of the gaseous mixture at 3–15 $kg/cm^2$-G and the cooling and liquefying temperature at $-10°$ C. to $-50°$ C. and to operate the stripping column at a pressure of 3–15 $kg/cm^2$-G and a bottom temperature of 20°–45° C.

The purity of chlorine obtained by such an operation is usually 99% by volume or higher.

Figure 3:
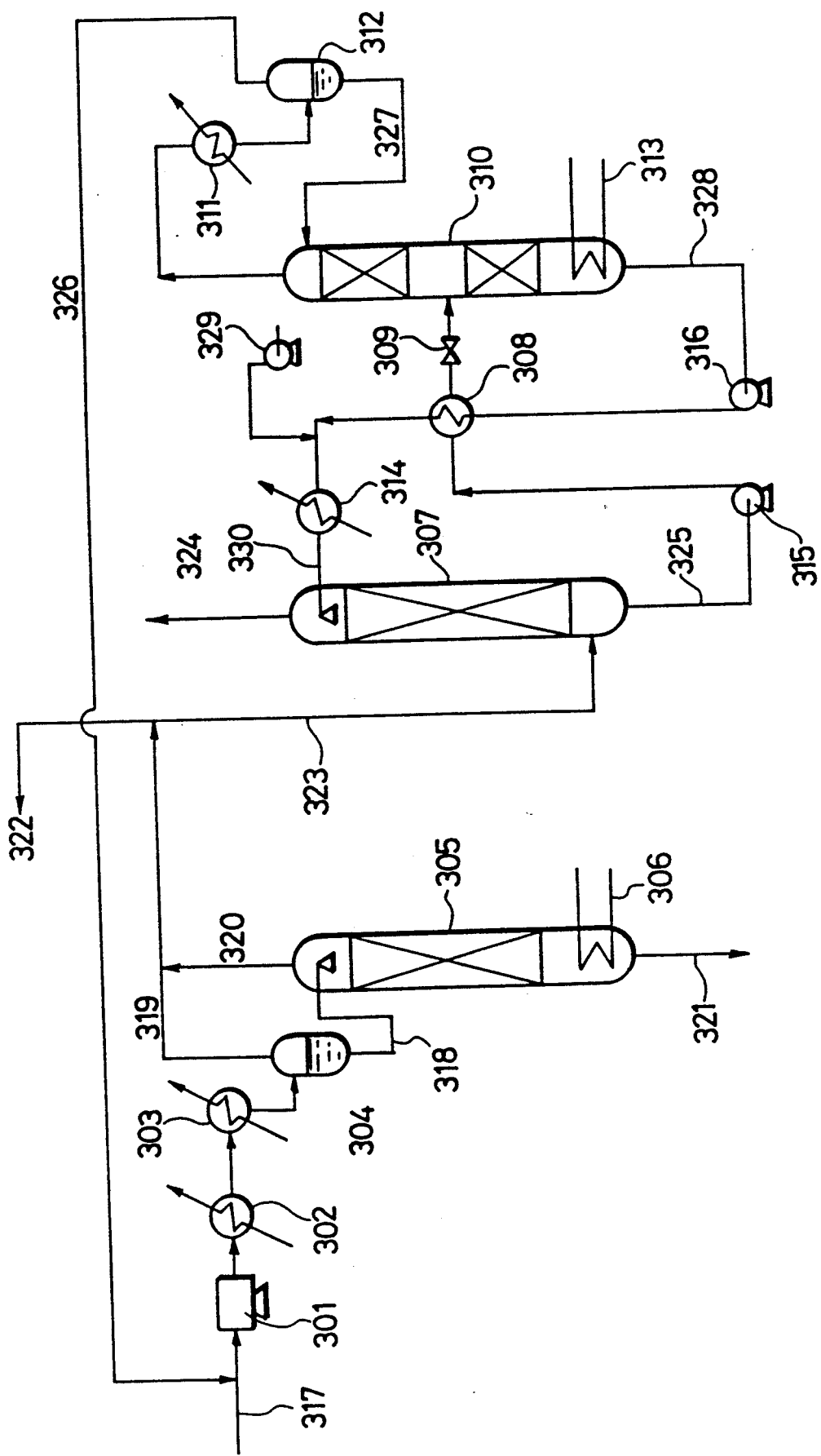
FIG. 3 is a flow sheet illustrating by way of example a plant for practicing an industrial process for the separation and recovery of chlorine, which comprises (i) compressing a gaseous mixture, which comprises 10–60% by volume of chlorine, carbon dioxide and non-condensable gas, and then cooling and liquefying the same, (ii) separating it into a residual gas formed principally of a major portion of the non-condensable gas and a condensate formed primarily of chlorine, (iii) feeding the condensate alone to a stripping column to desorb carbon dioxide and a minor portion of the non-condensable gas dissolved in the condensate, thereby separating and recovering chlorine, (iv) mixing a stripped gas, which has flowed out from the top of the stripping column and is formed primarily of chlorine and carbon dioxide, with the residual gas from step (i), (v) feeding at least a portion of the mixed gas into an absorption column to absorb a major portion of the remaining chlorine with a halogenated hydrocarbon, (vi) separating a waste gas, which is composed of carbon dioxide and the non-condensable gas and contains not more than 1% by volume of chlorine, and releasing the waste gas out of the system, (vii) feeding the chlorine-absorbed solvent into a distillation column to separate the solvent into a recovered gas, which is composed principally of chlorine, and the halogenated hydrocarbon, (viii) recirculating the solvent to use it as an absorbent in the absorption column, and (ix) recycling the recovered gas to the compression step.

In FIG. 3, there are depicted a compressor 301, a cooler 302, a condenser 303, a gas/liquid separator 304, a stripping column 305, a reboiler 306, an absorption column 307, a heat exchanger 308, a pressure reducing valve 309, a distillation column 310, a condenser 311, a gas/liquid separator 312, a reboiler 313, a cooler 314, and pumps 315 and 316. Incidentally, each of the columns 305, 307 and 310 may generally be a packed or tray column.

A gaseous mixture 317 comprising chlorine, carbon dioxide and non-condensable gas is mixed with a recovered gas 326 from the gas/liquid separator 312 and is then compressed to a predetermined compression pressure by the compressor 301.

In this manner, a gaseous mixture containing chlorine in a range of 10-60% by volume can be treated. Since gaseous mixtures of such a chlorine content are also formed upon production of chlorine by oxidation of hydrogen chloride in the presence of a specific chromium oxide catalyst, these gaseous mixtures can be treated by this process.

As the non-condensable gas in the gaseous mixture, nitrogen, oxygen, carbon monoxide and/or the like may be mentioned by way of example.

The compression pressure may be 3-15 kg/cm$^2$-G with 5-12 kg/cm$^2$-G being preferred. The gaseous mixture is cooled by the cooler 302, followed by liquefaction by the condenser 303. At least two thirds of the chlorine contained in the gaseous mixture are liquefied here.

The cooling and liquefying temperature may range from $-10°$ C. to $-50°$ C., with $-20°$ C. to $-40°$ C. being preferred.

After the resultant gas-liquid mixture is separated by the separator 304 into a residual gas 319 formed principally of a major portion of the non-condensable gas and a condensate 318 formed primarily of chlorine, the latter is fed to the stripping column 305.

The stripping column 305 may be operated at 3-15 kg/cm$^2$-G, preferably, 5-12 kg/cm$^2$.

The condensate which has been fed to the top falls down through the column. During this, carbon dioxide and non-condensable gas dissolved in the condensate are caused to evaporate from the condensate by ascending vapor which is composed primarily of chlorine boiled up by the reboiler 306 having a bottom temperature of 20°-45° C. Therefore, the condensate is collected as liquid chlorine in the bottom of the column and is obtained as product chlorine 321. The carbon dioxide and non-condensable gas which have evaporated from the condensate are allowed to flow out together with chlorine as a stripped gas 320 from the top of the stripping column 305 and are mixed with the residual gas 319. At least a portion of the mixed gas is fed to the absorption column 307. It is preferable to operate the absorption column under the same pressure as the stripping column, because the effect of absorption becomes greater as the pressure of the absorption column increases provided that the temperature of the absorbent solvent is constant.

From a gas 323 charged into the absorption column 307, almost the whole chlorine and portions of the carbon dioxide and non-condensable gas are absorbed in a solvent 330 falling from the top of the column. The gas 323 is therefore released out of the system as a waste gas 324 which is composed of carbon dioxide and non-condensable gas and contains not greater than 1% by volume of chlorine The solvent employed in the above process is a halogenated hydrocarbon such as carbon tetrachloride or chloroform. The solvent may be used in an amount 2-100 times, preferably, 3-30 times by weight the gas charged into the absorption column.

A solvent 325 with chlorine, carbon dioxide and non-condensable gas absorbed therein is drawn out from the bottom and is fed by the pump 315 to the heat exchanger 308. After being preheated by the heat exchanger 308, the solvent is fed to the distillation column 310.

The distillation column 310 may be operated at a pressure of 0.1-15 kg/cm$^2$-G, preferably, 1-10 kg/cm$^2$-G.

The solvent charged into the distillation column 310 is boiled up by the reboiler, condensed by the condenser and distilled by a reflux 327 to the distillation column, so that the gases absorbed are caused to evaporate to separate a recovered gas composed primarily of chlorine.

A solvent 328 having a chlorine concentration not higher than 5,000 ppm by weight, preferably, not higher than 500 ppm by weight is drawn out through the bottom of the column and is then fed to the heat exchanger 308. After heat is removed from the solvent by the heat exchanger 308, a fresh supply 329 of the solvent is added to replenish any loss. The solvent is thereafter cooled by the cooler 314 and is then fed back to the absorption column 307. Although the absorption ability of the absorption column becomes higher as the temperature at the inlet of the absorption column is lower, it is impossible to lower the temperature beyond the melting point of the solvent (for example, $-22.6°$ C. in the case of carbon tetrachloride). It is desirable to lower the temperature of the condenser of the distillation column to such an extent that the solvent does not evaporate and scatter. However, an unduly low temperature causes liquefaction of chlorine so that more chlorine accompanies the solvent to lower the absorbing ability of the recirculated solvent in the absorption column. Such an unduly low temperature is therefore not preferred.

It is hence necessary to suitably determine optimum conditions for the temperature of the solvent at the inlet of the absorption column and the temperature of the condenser of the distillation column by taking the above matters into consideration. Preferably, the temperature of the solvent at the inlet of the absorption column may be from $-20°$ C. to $0°$ C. and the temperature of the condenser of the distillation column may range from $-20°$ C. to $-10°$ C.

A description will next be made of a process for the removal of chlorine from a gaseous mixture containing chlorine gas and carbon dioxide gas, which comprises feeding an aqueous solution or suspension containing an alkali metal sulfite and/or an alkaline earth metal sulfite or containing an alkali metal sulfite and/or an alkaline earth metal sulfite along with an alkali metal hydroxide and/or an alkaline earth metal hydroxide in a proportion not greater than twice in molar ratio the alkali metal sulfite and/or alkaline earth metal sulfite, and washing the gaseous mixture with the solution or suspension while controlling the pH of the solution or suspension within a range of 1.9-6.3, whereby chlorine is removed from the gaseous mixture.

Examples of the alkali metal hydroxide useful in the practice of the above process include the hydroxides of alkali metals such as lithium, sodium and potassium, while illustrative alkaline earth metal hydroxides may be the hydroxides of magnesium, calcium, barium and the like.

On the other hand, the metal in the form of the sulfite may be an alkaline earth metal such as magnesium, calcium or barium. An alkali metal having a high solubility in water is however preferred.

When an alkali metal sulfite and/or an alkaline earth metal sulfite is used along with an alkali metal hydroxide and/or an alkaline earth metal hydroxide in the above process, it is essential to use the hydroxide in a proportion not greater than twice in molar ratio the sulfite.

Since this process requires an alkali for neutralizing chlorine and also a sulfite for reducing chlorine, at least one equivalent of a reductive sulfite is required per 2 equivalents of an alkali required for the neutralization.

If the proportion of the alkali exceeds twice in molar ratio the sulfite, the reductive sulfite becomes scarce and chlorine cannot be absorbed even if the pH is controlled within the range of 1.9–6.3.

If the proportion of the alkali is not greater than twice in molar ratio the sulfite, the sulfite acts as a substitute for the hydroxide. Further, the greater the sulfite, the more the bissulfite ions in the absorbent solution. The pH control is thus facilitated owing to their buffer action.

Accordingly, the washing solution may be that containing neither alkali metal hydroxide nor alkaline earth metal hydroxide. Chlorine in a waste gas can be absorbed with an aqueous solution or suspension of an alkali metal and/or an alkaline earth metal sulfite alone.

Figure 4:
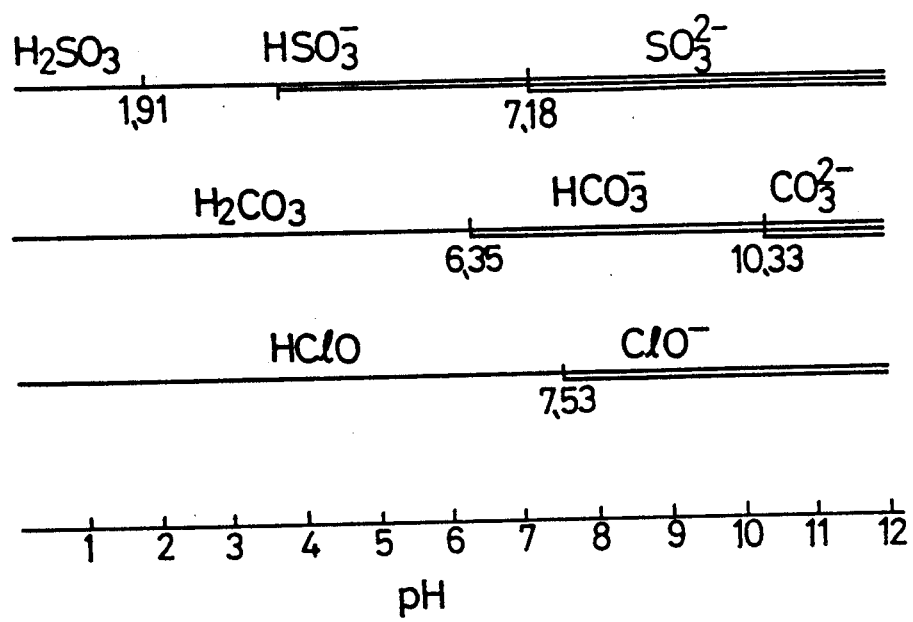
FIG. 4 illustrates ionic forms of absorbents, which are useful in the practice of the present invention, at various pH levels in their aqueous solutions.

The pH range suitable for the chlorine-absorbing reaction is 1.9–6.3. A pH higher than 6.3 converts carbon dioxide gas into bicarbonate ions as shown in FIG. 4, so that the alkali is consumed. More alkali is therefore consumed to make the process uneconomical.

When the pH becomes lower than 1.9, free sulfurous acid is formed and decomposed whereby sulfur dioxide gas tends to occur more easily. Such a low pH is accordingly not preferred.

This pH control of the aqueous solution within the range of 1.9–6.3 can be achieved by adjusting the amount of the alkali metal sulfite and/or alkaline earth metal sulfite to be added as well as the amount of the alkali metal hydroxide and/or alkaline earth metal hydroxide to be added in a proportion not greater than twice in molar ratio the sulfite.

In this case, the hydroxide and sulfite may each be added in a solid form or as an aqueous solution, the latter being preferred. They may be fed together as a single solution. Needless to say, they may be added as separate aqueous solutions.

The concentration of each aqueous solution may preferably be in a range that in the case of an alkali metal salt or alkaline earth metal salt, the raw materials and the resulting salt and sulfate are dissolved. Operation is however still feasible even when they are each added in the form of a slurry.

When the operation is carried out in a homogeneous system at a concentration near the solubility of the salt, the reaction temperature should be determined taking the solubility into parallel consideration. Since the solubilities of alkali metal and alkaline earth metal sulfites and chlorides are all not dependent too much on the temperature, use of a higher temperature cannot bring about any substantial effect for increasing their concentrations.

The reaction velocity between chlorine and a sulfite increases as the temperature becomes higher. A reaction temperature of from 0° C. to 70° C. is however preferred in view of the potential problems of corrosion and deterioration of the material of the reactor.

Regarding the manner of the reaction, the gas may be absorbed by causing it to bubble in a stirring tank or by treating it in a washing column.

Although the stage number varies depending upon the tolerable level of chlorine in the treated gas, it is not necessary to increase the stage number too much because the reaction or absorption velocity is high.

The above-described embodiment will next be described with reference to FIG. 5.

A gaseous mixture 401 which contains carbon dioxide gas and chlorine gas and may also contain nitrogen, oxygen and the like in some instances is introduced into a lower part of an absorption column 407, whereby the gaseous mixture 401 is washed with a washing liquid 402 recirculated from an upper part of the column. The washing liquid 402 is an aqueous solution or suspension which as described above, contains an alkali metal sulfite and/or alkaline earth metal sulfite or an alkali metal sulfite and/or alkaline earth metal sulfite along with an alkali metal hydroxide and/or alkaline earth metal sulfite and has a pH controlled within the range of 1.9–6.3.

The washing liquid is diluted with water to a desired concentration, and is recirculated while controlling its pH and maintaining its flow rate constant by means of an overflow 404.

After the treatment, a waste gas 406 from which chlorine gas alone has been removed with the washing liquid is released out of the system.

The processes according to the first to third aspects of the present invention, when practiced in combination, constitute an important part of an industrial production process for chlorine.

Figure 6:
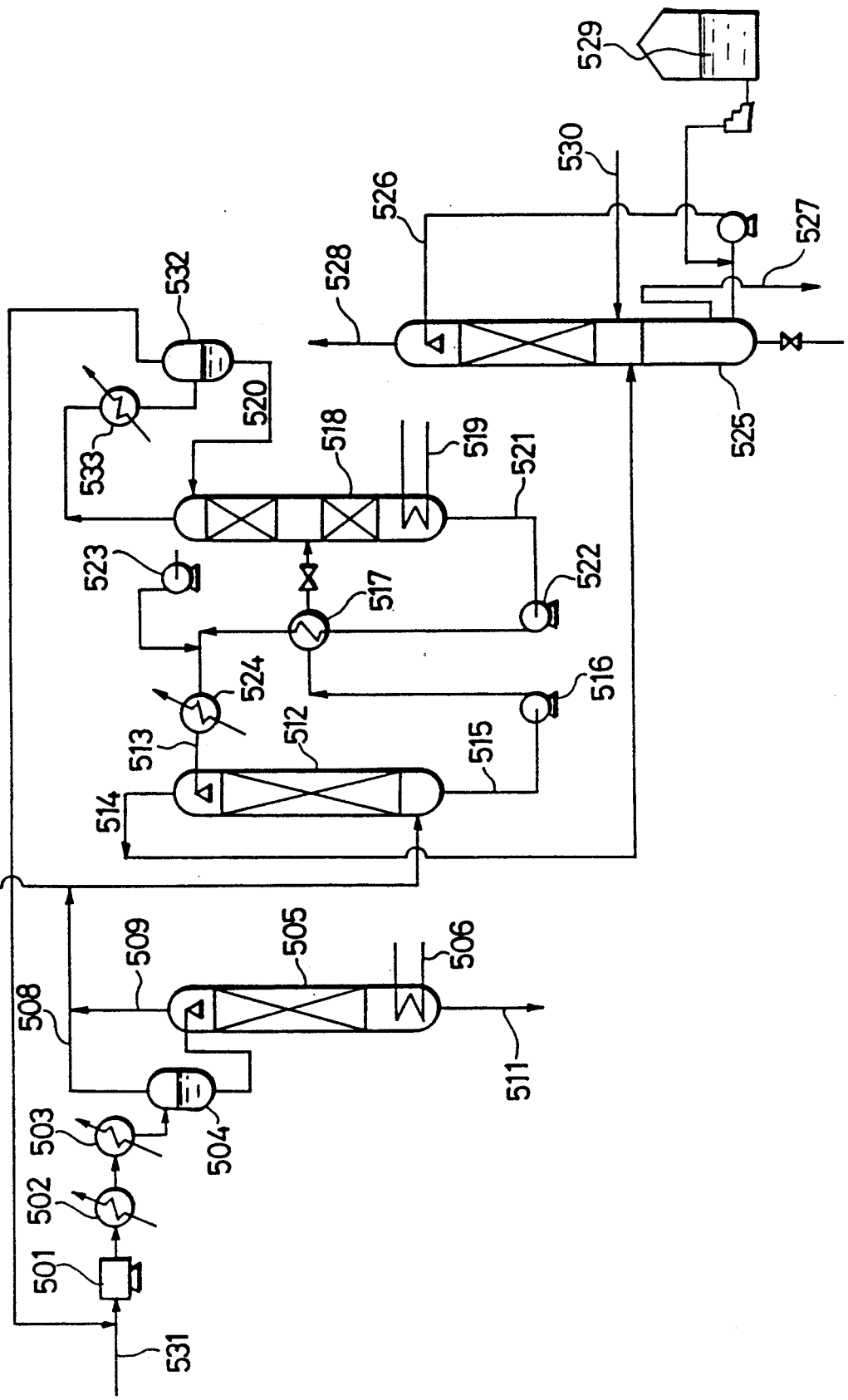
FIG. 6 is a flow chart of a plant which is suitable for use in practicing the processes according to the first, second and third aspects of this invention in combination.

Namely, it is possible to establish a combined process by combining the first, second and third aspects as illustrated in FIG. 6. The combined process permits highly-efficient recovery of chlorine from a gaseous mixture composed of carbon dioxide and non-condensable gas and containing chlorine and further almost complete removal of chlorine from a waste gas to be released out of the system, so that the pollution problem can be solved.

The combined process will hereinafter be described with reference to FIG. 6.

Like the embodiments described above, a gaseous mixture composed of carbon dioxide and non-condensable gas and containing chlorine is fed through a line 531 to a compressor 501, where it is compressed to a predetermined pressure. The gaseous mixture is cooled by a cooler 502 to a predetermine temperature and then liquefied by a condenser 503, so that a portion of the chlorine is liquefied. The resultant gas-liquid mixture is fed to a separator 504, where it is separated into a residual gas formed principally of a major portion of the non-condensable gas and a condensate formed primarily of chlorine. The condensate is fed to an upper part of a stripping column 505. While falling down through the column 505, the condensate is brought into contact with chlorine vapor boiled up by a reboiler 506 so that carbon dioxide and non-condensable gas dissolved in the condensate are caused to evaporate. Chlorine is collected in the bottom of the stripping column as liquid chlorine having a high purity and is then drawn as product chlorine through a line 511. The purity of chlorine obtained by such an operation is usually 99% by volume or higher.

The carbon dioxide and non-condensable gas which have evaporated from the condensate are allowed to flow from the top of the stripping column and then through a line 509, and join the residual gas fed from the separator through a line 508.

At least a portion of the mixed gas thus joined is fed to an absorption column 512. From the mixed gas charged into the absorption column, almost the whole chlorine and portions of the carbon dioxide and non-condensable gas are absorbed in a solvent 513 falling from the top of the column. Accordingly, the mixed gas can be converted into a waste gas 514 which is composed of carbon dioxide and non-condensable gas and contains not greater than 1% by volume of chlorine.

A solvent 515 with chlorine, carbon dioxide and non-condensable gas absorbed therein is drawn out from the bottom and is fed by a pump 516 to a heat exchanger 517. After being preheated by the heat exchanger 517, the solvent is fed to a distillation column 518.

The solvent charged into the distillation column 518 is boiled up by a reboiler 519, condensed by a condenser 533 and distilled by a reflux 520 to the distillation column, so that the gases absorbed are caused to evaporate to separate a recovered gas composed primarily of chlorine.

A solvent 521 having a chlorine concentration not higher than 5,000 ppm by weight, preferably, not higher than 500 ppm by weight is drawn out through the bottom of the column and is then fed by a pump 522 to the heat exchanger 517. After heat is removed from the solvent by the heat exchanger 517, a fresh supply 523 of the solvent is added to replenish any loss. The solvent is thereafter cooled by a cooler 524 and is then fed back to the absorption column 512.

A waste gas 514 composed of carbon dioxide and non-condensable gas and containing not more than 1% by volume of chlorine is introduced into a lower part of an absorption column 525, in which the waste gas 514 is washed with a washing liquid 526 recirculated from an upper part of the column. The washing liquid is an aqueous solution or suspension which as described above, contains an alkali metal sulfite and/or alkaline earth metal sulfite or an alkali metal sulfite and/or alkaline earth metal sulfite along with an alkali metal hydroxide and/or alkaline earth metal hydroxide and has a pH controlled within the range of 1.9–6.3. The washing liquid is diluted with water to a desired concentration, and is recirculated while controlling its pH and maintaining its flow rate constant by means of an overflow 527.

After the treatment, a waste gas 528 from which chlorine gas alone has been removed with the washing liquid is released out of the system.

The washing liquid is prepared from water 530 and an aqueous solution of sodium sulfite.

[EXAMPLES]

This invention will hereinafter be described in detail by the following Examples.

Example 1

An apparatus according to the flow sheet of FIG. 1 was provided.

The specifications of the stripping column, heat exchanger and separator are as follows:

| Stripping column | |
|---|---|
| Material: | SUS316L |
| Dimensions of column: | 50 mm across × 1,000 mm tall |
| Dimensions of packed part: | 50 mm across × 385 mm high |
| Packed material: | "Sulzer Labopack" (trade mark; product of Sumitomo Heavy Industries, Ltd.) |
| Reboiler part: | Electric heater, 1.0 KW max. |
| Heat exchanger: | |
| Material: | SUS316L |
| Heat transfer area: | 1.5 m$^2$ |
| Separator: | |
| Material: | SUS316L |
| Capacity: | 3.5 l |

A gaseous mixture composed of 50% by volume of chlorine, 15% of volume of carbon dioxide, 10% by volume of nitrogen and 25% by volume of oxygen was compressed to 7 kg/cm$^2$-G by the compressor and then caused to pass at a flow rate of 1.050 kgmol/hr through the heat exchanger, whereby the gaseous mixture was cooled to −24° C. After cooled by the heat exchanger, the gaseous mixture was fed to the separator so that it was separated into a gas and a liquid. The liquid alone was caused to fall down through the stripping column. The quantity of power fed to the electric heater was controlled in such a way that the reboiler part of the stripping column was maintained at 25° C. by the electric heater. Liquid chlorine was continuously drawn out to maintain constant the level of liquid chlorine in the reboiler.

When the apparatus had reached a steady state, the temperature of the upper part of the stripping column was −8° C., the temperature of the reboiler was 25° C., and the pressure of the top was 7.0 kg/cm$^2$-G. At that time, chlorine was obtained at a rate of 0.30 kgmol/hr from the bottom of the stripping column and its purity was 99.2% by volume.

Example 2

Using the apparatus employed in Example 1, a gaseous mixture composed of 39% by volume of chlorine, 13% by volume of carbon dioxide, 9% by volume of nitrogen and 39% by volume of oxygen was compressed to 10 kg/cm$^2$-G by the compressor and then caused to pass at a flow rate of 1.050 kgmol/hr through the heat exchanger, whereby the gaseous mixture was cooled to −40° C.

After cooled by the heat exchanger, the gaseous mixture was fed to the separator so that it was separated into a gas and a liquid. The liquid alone was caused to fall down through the stripping column. The quantity of power fed to the electric heater was controlled in such a way that the reboiler part of the stripping column was maintained at 37° C. by the electric heater Liquid chlorine was continuously drawn out to maintain constant the level of liquid chlorine in the reboiler.

When the apparatus had reached a steady state, the temperature of the upper part of the stripping column was −12° C., the temperature of the reboiler was 37° C., and the pressure of the top was 10 kg/cm$^2$-G. At that time, chlorine was obtained at a rate of 0.35 kgmol/hr from the bottom of the stripping column and its purity was 99.2% by volume.

Example 3

Using the apparatus employed in Example 1, a gaseous mixture composed of 10% by volume of chlorine, 17% by volume of carbon dioxide, 30% by volume of nitrogen and 43% by volume of oxygen was compressed to 12 kg/cm$^2$-G by the compressor and then caused to pass at a flow rate of 1.050 kgmol/hr through the heat exchanger, whereby the gaseous mixture was cooled to −40° C.

After cooled by the heat exchanger, the gaseous mixture was fed to the separator so that it was separated into a gas and a liquid. The liquid alone was caused to fall down through the stripping column. The quantity of power fed to the electric heater was controlled in such a way that the reboiler part of the stripping column was maintained at 45° C. by the electric heater. Liquid chlorine was continuously drawn out to maintain constant the level of liquid chlorine in the reboiler.

When the apparatus had reached a steady state, the temperature of the upper part of the stripping column was −8° C., the temperature of the reboiler was 45° C., and the pressure of the top was 12 kg/cm$^2$-G. At that time, chlorine was obtained at a rate of 0.04 kgmol/hr from the bottom of the stripping column and its purity was 99.2% by volume.

Comparative Example 1

Figure 2:
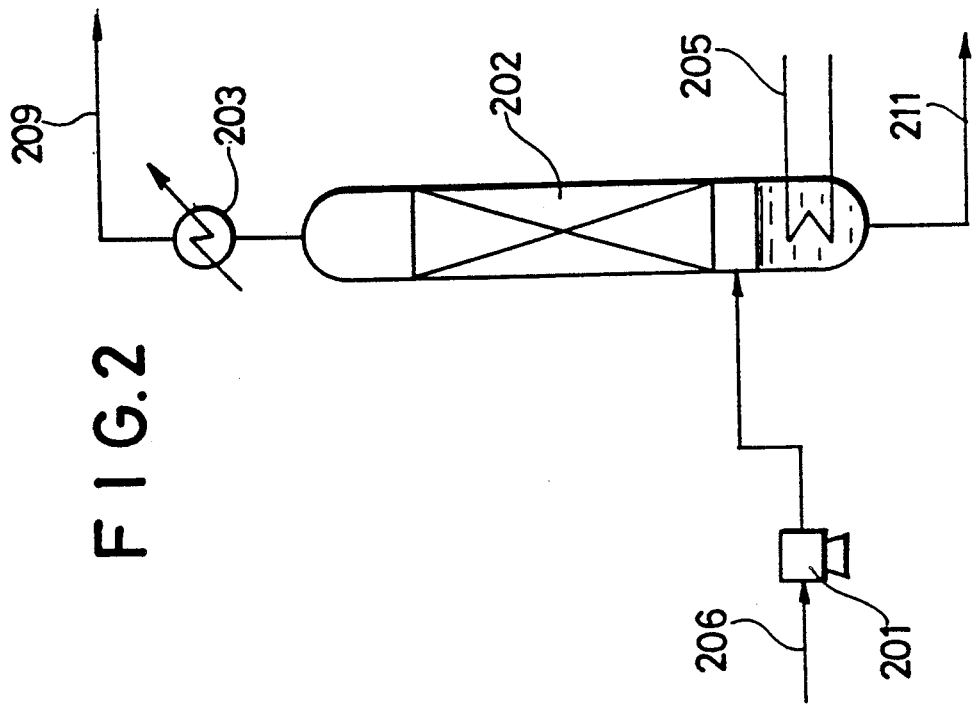
FIG. 2 is a flow sheet showing an apparatus employed in a comparative example, in which a conventional process corresponding to the process of FIG. 1 was practiced.

In accordance with the flow depicted in FIG. 2, an operation was conducted using the stripping column and heat exchanger employed in Example 1. It should be noted that the stripping column was modified to feed a gaseous mixture from the bottom instead of the top. A gaseous mixture composed of 50% by volume of chlorine, 15% by volume of carbon dioxide, 10% by volume of nitrogen and 25% by volume of oxygen was compressed to 7 kg/cm$^2$-G by a compressor 201 and then fed at a flow rate of 0.24 kgmol/hr to the bottom of the stripping column 202. The outlet gas temperature was controlled at −24° C. by a heat exchanger 203. The quantity of power fed to the electric heater was controlled in such a way that the reboiler part of the stripping column was maintained at 18° C. by the electric heater. Liquid chlorine was continuously drawn out to maintain constant the level of liquid chlorine in the reboiler 205.

When the apparatus had reached a steady state, the temperature at the gas outlet of the heat exchanger 203 was −24° C., the temperature of the reboiler 205 was 18.4° C., and the pressure of the top was 7 kg/cm$^2$-G. At that time, chlorine was obtained at a rate of 0.09 kgmol/hr from the bottom of the stripping column and its purity was 99.0% by volume. It is clear that the treatment capacity of a gaseous mixture by a process, in which a condensate alone is subjected to stripping as in Example 1, is as much as at least about 4 times the conventional process of Comparative Example 1.

Comparative Example 2

Using an apparatus employed in Comparative Example 1, a similar test was conducted except that the feeding rate of the gas to the bottom of the stripping column was changed to 0.60 kgmol/hr. It was however impossible to operate the apparatus in a steady state because the temperatures of the gases at the inlet and outlet of the heat exchanger varied and were unstable. It is understood that the operation becomes infeasible if the treatment capacity is increased in the conventional process.

Example 4

An apparatus according to the flow sheet of FIG. 3 was provided.

A gaseous mixture composed of 38.9% by volume of chlorine, 12.9% by volume of carbon dioxide and 48.2% by volume of nitrogen plug oxygen was fed to the apparatus. When the compression pressure of the compressor and the cooling and liquefying temperature of the condenser were set at 7 kg/cm$^2$-G and −24° C. respectively, 27.3% of the gaseous mixture, namely, 67.5% of the chlorine in the gaseous mixture was condensed. The condensate was fed to the upper part of the stripping column. The stripping column was operated by controlling its top pressure and bottom temperature at 7 kg/cm$^2$-G and 25.4° C. respectively, thereby obtaining liquid chlorine containing 99.5% of chlorine.

A distilled gas from the upper part of the stripping column contained 18.6% by volume of chlorine, 17.1% by volume of carbon dioxide and 64.3% by volume of nitrogen plus oxygen. Carbon tetrachloride in an amount 3.6 times by weight the feed gas to the absorption column was cooled to −15° C. and used as an absorbent solvent. The absorption column was operated so as to maintain the top pressure at 7 kg/cm$^2$-G The composition of a waste gas from the top of the absorption column was 47 ppm by volume of chlorine, 9.7% by volume of carbon dioxide, 80.1% by volume of nitrogen plus oxygen, 0.2% by volume of carbon tetrachloride.

Carbon tetrachloride with chlorine absorbed therein was fed by the pump from the bottom to the distillation column. The distillation column was operated at a top pressure of 1.3 kg/cm$^2$-G, a condenser temperature of −15° C. and a bottom temperature of 105.6° C. The composition of a gas recovered from the top of the distillation column was 89.4% by volume of chlorine, 7.3% by volume of carbon dioxide, 3.3% by volume of nitrogen plus oxygen, and 500 ppm by volume of carbon tetrachloride. The chlorine concentration in the solvent was 5 ppm by weight. The recovery rate of chlorine was 99.99%.

Example 5

To the apparatus employed in Example 4, was fed a gaseous mixture composed of 25% by volume of chlorine, 11% by volume of carbon dioxide and 64% by volume of nitrogen plus oxygen. When the compression pressure and the cooling and liquefying temperature were set at 9 kg/cm$^2$-G and −37° C. respectively, 20% of the gaseous mixture, namely, 71% of the chlorine in the gaseous mixture was condensed.

Next, the condensate was only fed to the stripping column. The stripping column was operated by controlling its top pressure and bottom temperature at 9 kg/cm$^2$-G and 28.9° C. respectively, thereby obtaining liquid chlorine containing 96.3% of chlorine. Here, the gas at the inlet of the absorption column was composed of 9.9% by volume of chlorine, 12.9% by volume of carbon dioxide, and 77.2% by volume of nitrogen plus oxygen. Carbon tetrachloride in an amount 4.1 times by weight the feed gas to the absorption column was cooled to −17° C. and used as an absorbent solvent. The absorption column was operated so as to maintain the top pressure at 9 kg/cm$^2$-G. The composition of a waste gas from the top of the absorption column was 16 ppm by volume of chlorine, 12.4% by volume of carbon dioxide, 87.4% by volume of nitrogen plus oxygen, 0.2% by volume of carbon tetrachloride. On the other hand, the absorbent solvent was fed by the pump from the bottom of the absorption column to the distillation column. The distillation column was operated at a top pressure of 3.5 kg/cm$^2$-G, a condenser temperature of 2° C. and a bottom temperature 132.9° C. The composition of a gas distilled out from the top of the distillation column was 75.7% by volume of chlorine, 15.8% by volume of carbon dioxide, 8.5% by volume of nitrogen plus oxygen, and 480 ppm by volume of carbon tetrachloride The chlorine concentration in the solvent was 36 ppm by weight. The recovery rate of chlorine was 99.99%.

Example 6

In a flask charged with 1 l of a 10 wt.% aqueous solution of sodium sulfite and equipped with an overflow tube opening at the lower end thereof, a mixture of 1 l/min of carbon dioxide gas and 100 ml/min of chlorine gas was allowed to bubble while tracing pH variations. In the beginning, the blown gas was absorbed in its entirety. The pH dropped as the blowing was continued. When the pH dropped to 6 and lower, a portion of the gas started passing through. When the pH reached 4, the feeding of a 10% aqueous solution of sodium sulfite was started at a rate of 15.7 cc/min to maintain the pH at 4.

In the above state, the gas passed through without absorption in the solution was caused to flow through a trap of an N/2 solution of potassium iodide and then through another trap of an N/2 solution of caustic soda Those solutions were titrated with N/10 sodium thiosulfate while using an aqueous solution of starch as an indicator, whereby the chlorine levels in the traps were determined by titration. The concentration of chlorine in the waste gas was found to be not higher than 1 ppm by volume.

In addition, the carbonic acid absorbed in the N/2 solution of potassium iodide and that absorbed in the N/2 solution of caustic soda were titrated respectively with N/10 NaOH and N/10 HCl while using methyl orange as an indicator. As a result, it was confirmed that the carbon dioxide gas blown was not absorbed in its entirety and was allowed to pass to an extent through the flask.

Example 7

A similar reactor as in Example 6 was charged with an aqueous solution which contained 8.6% by weight of sodium sulfite and 1.4% by weight of caustic soda. Similarly, 1 l/min of carbon dioxide gas and 100 cc/min of chlorine gas were mixed and caused to flow. When the pH reached 4, the feeding of an aqueous solution of the same composition as the feed solution was started at a rate of 12.1 ml/min so as to maintain the pH at 4. A gas passed through the flask in the above state was analyzed by a similar method as in Example 6. As a result, it was confirmed that the chlorine level was not higher than 1 ppm by volume and the carbon dioxide passed in its entirety.

Example 8

Figure 5:
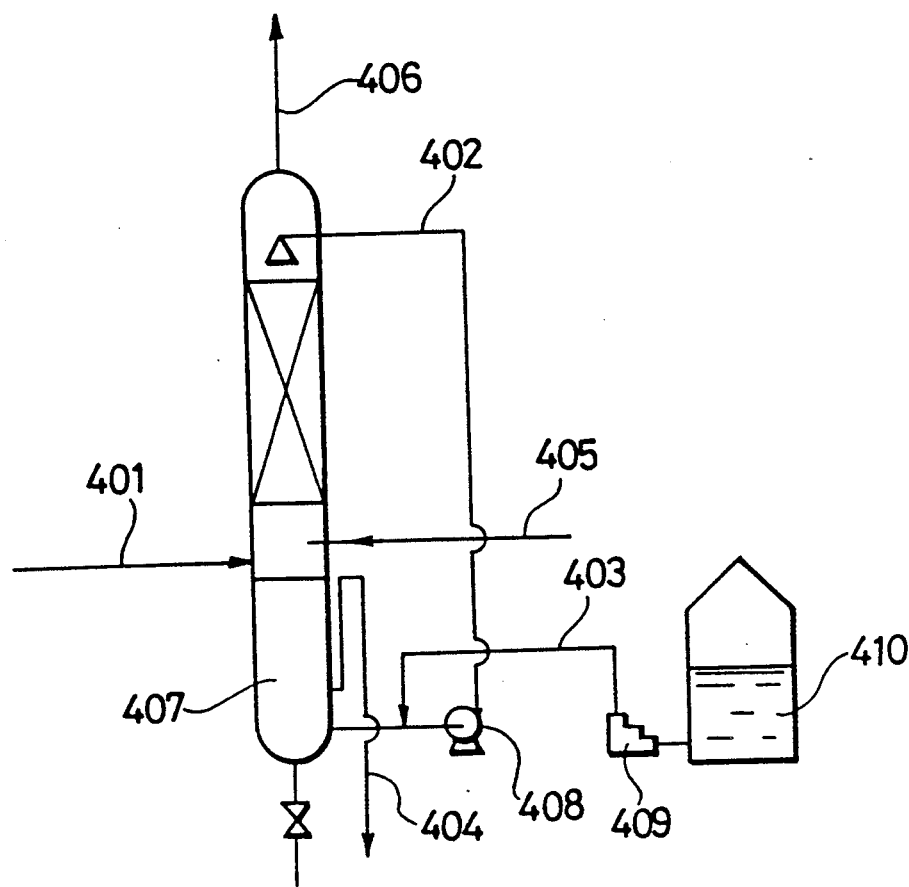
FIG. 5 is a flow chart depicting the absorption of chlorine in Example 8.

In accordance to the flow illustrated in FIG. 5, a gaseous mixture 401 containing 30% by volume of carbon dioxide gas, 70% by volume of nitrogen plus oxygen and 1,000 ppm by volume of chlorine gas was introduced at a rate of 500 Nm$^3$/hr from a lower part of the absorption column 407. The absorption column had a diameter of 0.8 m and was packed with 1-inch Raschig rings to a height of 2.2 m. The gaseous mixture 401 was washed with an absorbent liquid 402 recirculated at 10 m$^3$/hr from the top of the column. In the column, the pH was maintained at 4.0 with about 94.5 kg/hr of an aqueous solution 403 containing 10% by weight of sodium sulfite while adding water 405 at a rate of 278 kg/hr. At the same time, the liquid level was maintained constant by means of an overflow line 404. A treated gas 406 flowed out of the column through an upper part thereof was sampled. As a result of its absorption and analysis with an N/10 aqueous solution of potassium iodide, the chlorine level was found to be 1 ppm by volume or lower.

Example 9

The flow sheet of an apparatus used in the present Example is illustrated in FIG. 6.

Fed to the apparatus was a gaseous mixture composed of 38.9% by volume of chlorine, 12.9% by volume of carbon dioxide and 48.2% by volume of nitrogen plus oxygen. When the compression pressure of the compressor and the cooling and liquefying temperature of the condenser were set at 7 kg/cm$^2$-G and $-24°$ C. respectively, 27.3% of the gaseous mixture, namely, 67.5% of the chlorine in the gaseous mixture was condensed. The condensate was only fed to the upper part of the stripping column. The stripping column was operated by controlling its top pressure and bottom temperature at 7 kg/cm$^2$-G and 25.4° C. respectively, thereby obtaining liquid chlorine containing 99.5% of chlorine.

A distilled gas from the upper part of the stripping column contained 18.6% by volume of chlorine, 17.1% by volume of carbon dioxide, and 64.3% by volume of nitrogen plus oxygen.

Carbon tetrachloride in an amount 3.6 times by weight the feed gas to the absorption column was cooled to $-15°$ C. and used as an absorbent solvent. The absorption column was operated so as to maintain the top pressure at 7 kg/cm$^2$-G. The composition of a waste gas from the top of the absorption column was 47 ppm by volume of chlorine, 19.7% by volume of carbon dioxide, 80.1% by volume of nitrogen plus oxygen, 0.2% by volume of carbon tetrachloride.

Carbon tetrachloride with chlorine absorbed therein was fed by the pump from the bottom to the distillation column. The distillation column was operated at a top pressure of 1.3 kg/cm$^2$-G, a condenser temperature of $-15°$ C. and a bottom temperature of 105.6° C. The composition of a gas recovered from the top of the distillation column was 89.4% by volume of chlorine, 7.3% by volume of carbon dioxide, 3.3% by volume of nitrogen plug oxygen, and 500 ppm by volume of carbon tetrachloride. The chlorine concentration in the solvent was 5 ppm by weight. The recovery rate of chlorine was 99.99%.

A gaseous mixture discharged from the top of the absorption column and composed of 47 ppm by volume of chlorine, 19.7% by volume of carbon dioxide, 80.1% by volume of nitrogen plus oxygen and 0.2% by volume of carbon tetrachloride was introduced into the waste gas washing column to remove chlorine. The gaseous mixture was introduced from the bottom, while the absorbent liquid recirculated was caused fall down from the top. Accordingly, the chlorine in the gaseous mixture was absorbed.

As the absorbent liquid, an aqueous solution containing 10% by weight of sodium sulfite was caused to flow down while controlling its pH at 4.2. The absorbent liquid was brought into contact with the gaseous mixture to have it absorb chlorine.

The chlorine concentration in the gas released from the top was not higher than 1 ppm by volume.

What we claim is:

1. A process for the separation and recovery of chlorine from a gaseous mixture comprising chlorine, carbon dioxide and non-condensible gas, which comprises compressing and cooling the gaseous mixture to separate the gaseous mixture into a residual waste gas formed principally of a major portion of the non-condensible gas and a condensate formed primarily of chlorine, subjecting said condensate to a stripping column to desorb waste carbon dioxide and remaining minor portion of the non-condensible gas dissolved in the condensate and recovering liquefied chlorine from said stripping column.

2. A process for the separation and recovery of chlorine from a gaseous mixture comprising chlorine, carbon dioxide and non-condensable gas in a separation and recovery system, which comprises (i) compressing the gaseous mixture, and then cooling and liquefying the same thereby to separate it into a residual gas formed principally of a major portion of the non-condensable gas and a condensate formed primarily of chlorine, (ii) feeding the condensate alone to a stripping column to desorb carbon dioxide and a minor portion of the non-condensable gas dissolved in the condensate, thereby separating and recovering chlorine, (iii) mixing a stripped gas, which has flowed out from the top of the stripping column and is formed primarily of chlorine and carbon dioxide, with the residual gas from step (i), (iv) feeding at least a portion of the mixed gas into an absorption column which makes use of a halogenated hydrocarbon as a solvent, whereby a major portion of remaining chlorine is absorbed to lower the chlorine content and a waste gas composed substantially of carbon dioxide and the non-condensable gas is separated and released out of the system, and (v) feeding the solvent with chlorine absorbed therein into a distillation column to separate chlorine from the halogenated hydrocarbon.

3. A process for the separation and recovery of chlorine from a gaseous mixture comprising chlorine, carbon dioxide and non-condensable gas in a separation and recovery system, which comprises (i) compressing the gaseous mixture and then cooling and liquefying the same thereby to separate it into a residual gas formed principally of a major portion of the non-condensable gas and a condensate formed primarily of chlorine, (ii) feeding the condensate alone to a stripping column to desorb carbon dioxide and a minor portion of the non-condensable gas dissolved in the condensate, thereby separating and recovering chlorine, (iii) mixing a stripped gas, which has flowed out from the top of the stripping column and is formed primarily of chlorine and carbon dioxide, with the residual gas from step (i), (iv) feeding at least a portion of the mixed gas into an absorption column which makes use of a halogenated hydrocarbon as a solvent, whereby a major portion of remaining chlorine is absorbed to lower the chlorine content and a waste gas composed substantially of carbon dioxide and the non-condensable gas is separated and released out of the system, (v) feeding the chlorine-absorbed solvent into a distillation column to separate the solvent into a recovered gas, which is composed principally of chlorine, and the halogenated hydrocarbon, and (vi) using the thus-separated halogenated hydrocarbon as an absorbent for the absorption column in step (iv) and recycling the recovered gas to the compression step in step (i).

4. The process as claimed in claim 2 or 3, wherein the chlorine concentration of the gaseous mixture is 10–60% by volume.

5. The process as claimed in claim 2 or 3, wherein the chlorine concentration of the waste gas released out of the system is not higher than 1% by volume.

* * * * *